United States Patent [19]

Gruntman

[11] 4,219,387
[45] Aug. 26, 1980

[54] SOLAR STILL

[76] Inventor: Leonard R. Gruntman, 1644 Tubbs Ave., Benton Harbor, Mich. 49022

[21] Appl. No.: 861,976

[22] Filed: Dec. 19, 1977

[51] Int. Cl.² ............................ C02B 1/04; F24J 3/02
[52] U.S. Cl. .................................. 202/182; 202/189; 202/234; 159/1 SF; 47/1 R; 203/10; 203/DIG. 1; 203/DIG. 22; 210/11; 210/220
[58] Field of Search .................... 47/1 R; 203/DIG. 1, 203/10, 11, 100, 99; 202/234, 182, DIG. 22, 202, 83, 185 R, 189; 159/1 SF, 1 S; 126/271, 270; 210/11, 220

[56] References Cited

U.S. PATENT DOCUMENTS

| | | | |
|---|---|---|---|
| 1,952,520 | 3/1934 | Urguhart | 159/1 SF |
| 2,332,294 | 10/1943 | Bohmfaulk | 203/DIG. 1 |
| 2,412,466 | 12/1946 | Miller | 203/DIG. 1 |
| 2,424,142 | 7/1947 | Bimpson et al. | 203/DIG. 1 |
| 2,803,591 | 8/1957 | Coanda et al. | 202/234 |
| 2,807,912 | 10/1957 | Bjorksten | 203/DIG. 1 |
| 3,138,546 | 6/1964 | Muller | 203/DIG. 1 |
| 3,230,967 | 1/1966 | Castro | 47/1 |
| 3,300,393 | 1/1967 | Fisher | 202/234 |
| 3,351,536 | 11/1967 | Fox | 202/83 |
| 3,408,260 | 10/1968 | Feldman et al. | 159/1 SF |
| 3,490,996 | 1/1970 | Kelly | 202/234 |
| 3,928,145 | 12/1975 | Othmer | 203/DIG. 1 |
| 3,986,936 | 10/1976 | Rush | 203/DIG. 1 |
| 4,075,063 | 2/1978 | Tsay et al. | 203/DIG. 1 |

FOREIGN PATENT DOCUMENTS

| | | | |
|---|---|---|---|
| 820705 | 8/1937 | France | 203/DIG. 1 |
| 1038320 | 8/1966 | United Kingdom | 47/1 |

Primary Examiner—Wilbur L. Bascomb, Jr.
Attorney, Agent, or Firm—Blanchard, Flynn, Thiel, Boutell & Tanis

[57] ABSTRACT

A solar still adapted to float on a body of water has a toroidal evaporating chamber with sunlight admitting and absorbing, respectively, top and bottom walls for vaporizing water from the body admitted to overlie the bottom wall. A surrounding inner float ring and underlying toroidal inflatable float support the chamber. A condenser depends from and communicates with the evaporating chamber through elongate coaxial vapor outlet and air return tubes, and in turn supplies distillate to a pendent holding tank. A rotatable shaft extending coaxially down through the evaporating chamber carries a fan to propel vapor from the evaporating chamber into the condenser due to rotation of a windmill atop the chamber. A curved reflector is rotatably driven atop the inner ring to direct additional sunlight on the evaporating chamber as the sun moves overhead. An outer float ring loosely coaxially surrounds the inner float ring. The annular water surface between the float rings, covered by a transparent film, forms an oxygen production zone occupiable by oxygen producing phytoplankton fed by nutrients in water brought up from beneath the thermocline by thermosiphon flow between the warm condenser and a surrounding heat skirt. Pump units mounted on the outer float ring remove distilled water and any oxygen produced, the latter for example to a device for dissolving the oxygen below the thermocline in the body of water.

14 Claims, 13 Drawing Figures

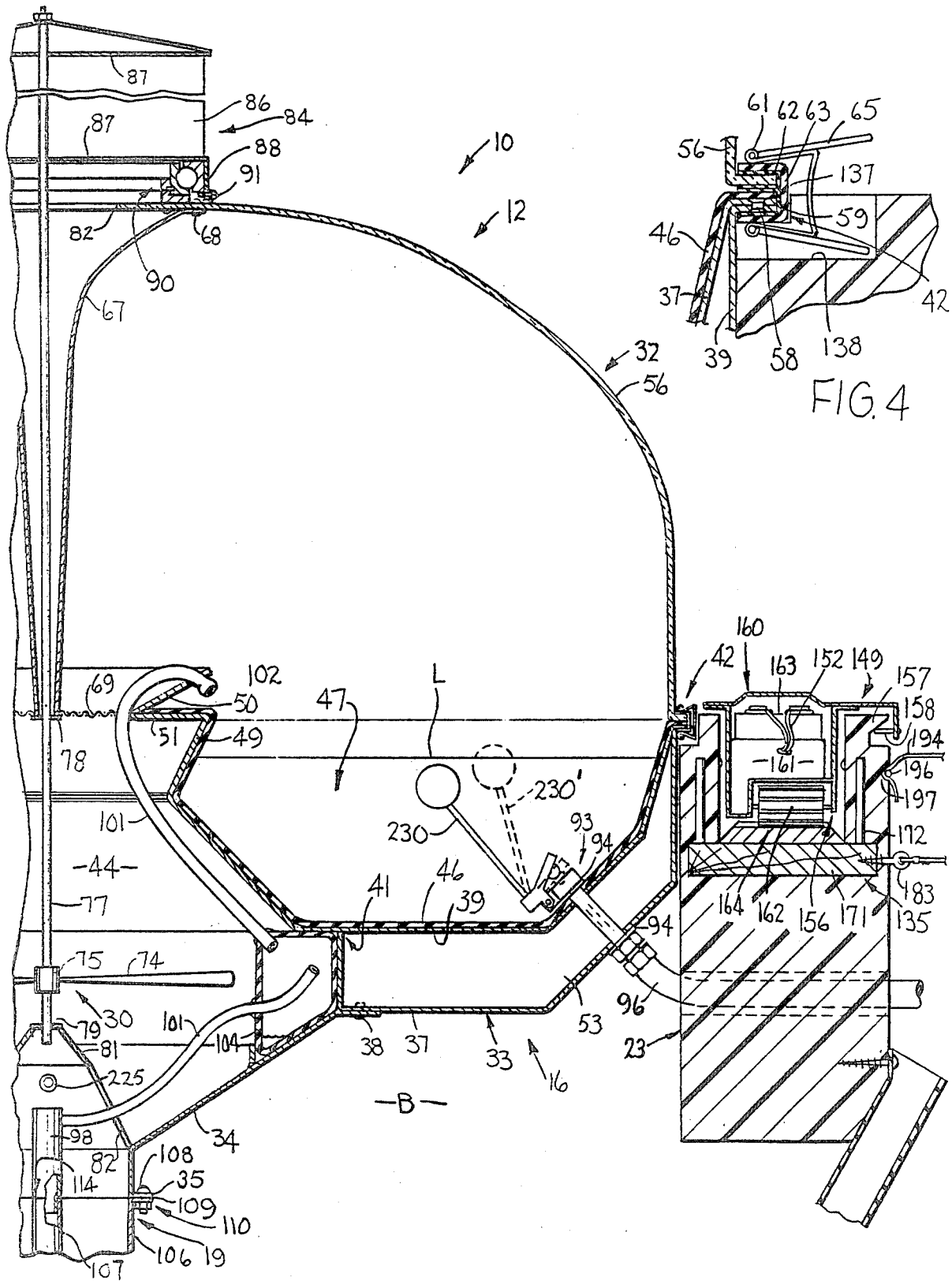

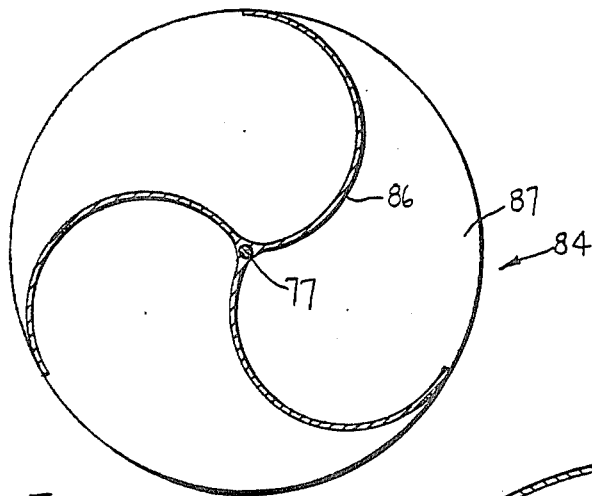
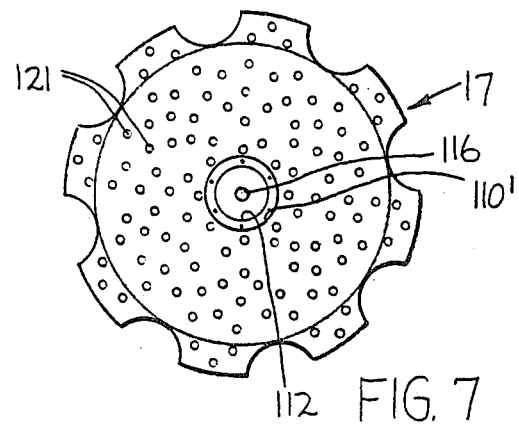
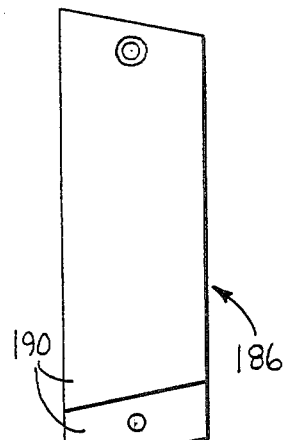
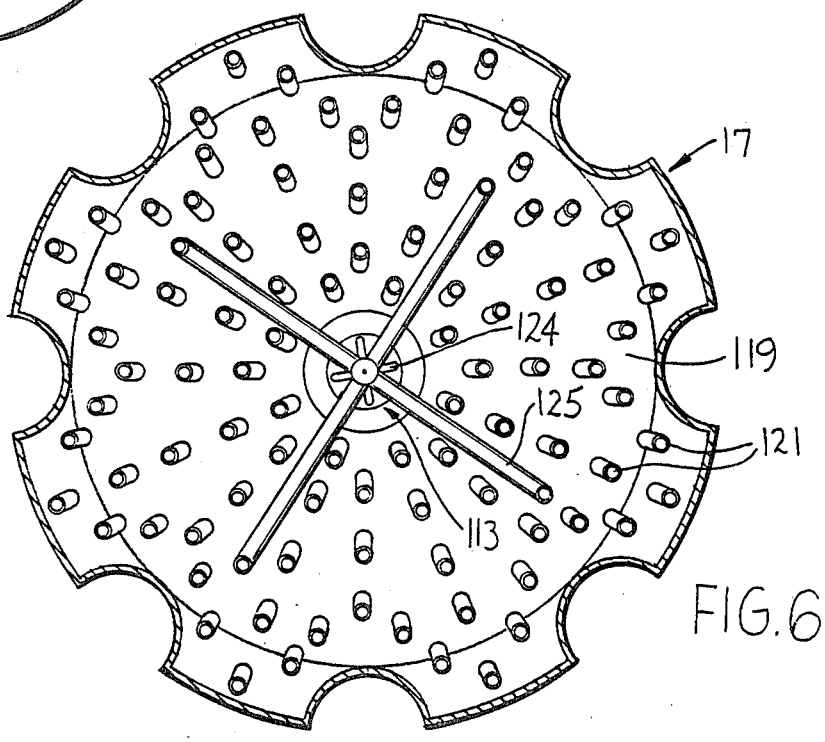
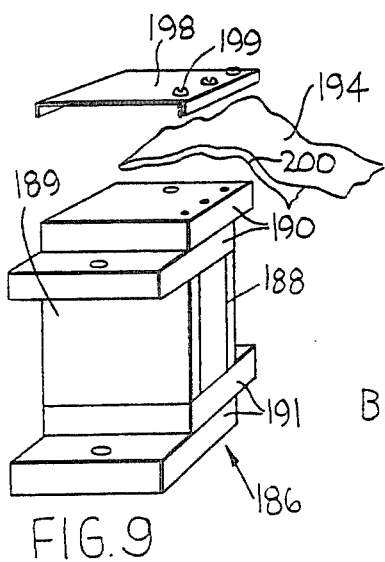
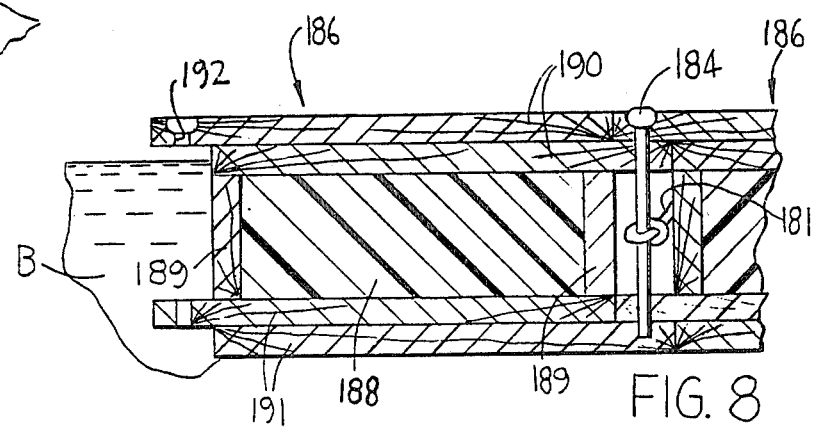

SOLAR STILL

FIELD OF THE INVENTION

This invention relates to a floating solar still.

BACKGROUND OF THE INVENTION

Floating solar stills have long been known and typical examples are disclosed in U.S. Pat. Nos. 2,412,466 (North), 2,424,142 (Bimpson), 3,397,117 (Smith), 3,408,260 (Feldman), 3,415,719 (Telkes), and 3,703,433 (Evans). In general, floating solar stills are located on a body of water containing objectionable impurities (salt as in ocean water, various pollutants, etc.) which make it unfit for a desired purpose, such as drinking. Characteristically, such stills incorporate an enclosure in which water to be distilled lies atop a dark surface and beneath a transparent sunlight admitting sheet, such that sunlight entering through the transparent sheet is absorbed by and warms the dark surface, which warms and vaporizes the liquid.

In general, the prior solar stills disclosed in the above-listed patents are of relatively insubstantial construction to permit storage in a compact package, e.g. for emergency use at sea by shipwrecked or otherwise stranded persons. Such solar stills have typically used a plastic film envelope with sunlight admitting and absorbing portions, flotation and shaping of the apparatus being accomplished by inflation of the evaporating envelope itself or inflatable tubes formed in the walls thereof. At least in some instances water to be distilled must be added manually, on a batch-by-batch basis.

Typically, such prior devices have been intended to condense the water vapor on surfaces within the floating vaporizing envelope itself, i.e. on envelope surfaces near the relatively warm surface of the supporting body of water such that condenstaion proceeds slowly. Also, such condensing surfaces are likely to be near the contaminated liquid to be vaporized, risking contamination therefrom. In one such prior floating still, a separate condenser is located at a distance from the vaporizing chamber; however a manually operated pump is required to transfer the vapor from the evaporating chamber to the condenser.

Thus, prior devices of the type above set forth have tended to be of relatively light, delicate, collapsible construction best suited for temporary emergency use rather than in a substantially permanent installation, have tended to sacrifice efficiency for the sake of minimizing cost and maximizing collapsibility into a small space, and/or have required substantial and frequency attention by a human operator, and/or manual pumping to provide a distilled water output. Moreover, the aforementioned structures have not attempted to provide any enhancement of the local ecology, but instead are clearly directed to production of a single output, namely distilled water.

Moreover, such prior devices do not appear to attempt to tap naturally available energy sources other than the solar input used for vaporizing liquid, nor do the aforementioned patents disclose structure for using solar energy other than for vaporizing of the contaminated water.

Accordingly, the objects and purposes of this invention include provision of:

1. A floating solar still apparatus adapted to support itself upon a body of water, such as a pond, bay, etc. of salt, contaminated fresh or otherwise impure water, from which potable water is to be obtained by distillation.

2. Apparatus, as aforesaid, arranged to enhance efficiency in distillation by condensing the vaporized liquids below the thermocline in the body of water at a location well spaced below the solar heated evaporation chamber and wherein vapor is conveyed to the remote condenser without need for manual, electrical or other imported power inputs.

3. Apparatus, as aforesaid, which utilizes locally available natural energy inputs in addition to solar energy, namely wind energy, in its operation, particularly for moving vapor from the evaporating chamber to the condenser.

4. Apparatus, as aforesaid, capable of enhancing the quantity of solar energy falling on the evaporating chamber by automatic positioning of a solar reflector in at least approximate tracking relation with the sun as the latter moves across the sky.

5. Apparatus, as aforesaid, in which waste heat from the condenser is utilizable for preheating the raw liquid input to the evaporating chamber and, if desired, for upward directing of water from lower levels in the body of water to obtain other local ecology assisting products from the apparatus.

6. Apparatus, as aforesaid, which with addition of a transparent plastic film annulus extending radially between the distillation portion of the apparatus and an outer stabilizing float ring, can encourage phytoplankton activity, in terms of enhanced food and oxygen production, for enhanced growth of fish and other useful marine life in the area.

7. Apparatus, as aforesaid, which is capable of ready disassembly for maintenance and removal of precipitates, and which is intended to perform for long periods with minimal human attention in either permanent or semi-permanent location on a body of water.

8. Apparatus, as aforesaid, which without inhibiting other sunlight requiring functions, provides substantial space for support of electricity producing solar cells, e.g. to power reflector rotation, distilled water output pumping and oxygen pumping devices.

Other objects and purposes of the invention will be apparent to persons acquainted with apparatus of this general type upon reading the following specification and inspecting the accompanying drawings.

SUMMARY OF THE INVENTION

The objects and purposes of the invention are met by providing a solar still adapted to float on a body of water having a toroidal evaporating chamber with sunlight admitting and absorbing, respectively, top and bottom walls for vaporizing water from the body admitted to overlie the bottom wall. A surrounding inner float ring and underlying toroidal inflatable float support the chamber. A condenser depends from and communicates with the evaporating chamber through elongate coaxial vapor outlet and air return tubes, and in turn supplies distillate to a pendent holding tank. A rotatable shaft extends coaxially down through the evaporating chamber and carries a fan to propel vapor from the evaporating chamber into the condenser in response to rotation of a windmill atop the chamber. A curved reflector rotatably driven atop the inner ring directs additional sunlight on the evaporating chamber as the sun moves overhead. An outer float ring loosely coaxially surrounds the inner float ring. The annular water surface between the float rings, covered by a transparent film, forms an oxygen production zone occupiable by oxygen producing phytoplankton fed by nutrients in water brought up from beneath the thermocline by thermosiphon flow between the warm condenser and a surrounding heat skirt. Pump units mounted on the outer float ring remove distilled water and any oxygen produced, the latter for example to a device for dissolving the oxygen below the thermocline in the body of water.

BRIEF DESCRIPTION OF THE DRAWINGS

In the drawings:

FIG. 3 is an enlarged fragmentary view of a portion of the FIG. 2 apparatus.

FIG. 4 is an enlarged fragmentary view showing the edge connection of the sunlight admitting and sunlight absorbing portions of the FIG. 3 apparatus.

FIG. 5 is an enlarged sectional view substantially taken on the line V—V of FIG. 2.

FIG. 6 is an enlarged sectional view substantially taken on the line VI—VI of FIG. 2.

FIG. 7 is an enlarged sectional view substantially taken on the line VII—VII of FIG. 2.

FIG. 8 is an enlarged sectional view substantially taken on the line VIII—VIII of FIG. 1 to show segments of the outer float ring.

FIG. 9 is an exploded pictorial view showing the manner of securement of a portion of the oxygen containment plastic film to the outer float ring.

FIG. 10 is a top view of one segment of the outer float ring.

DETAILED DESCRIPTION

Figure 1:
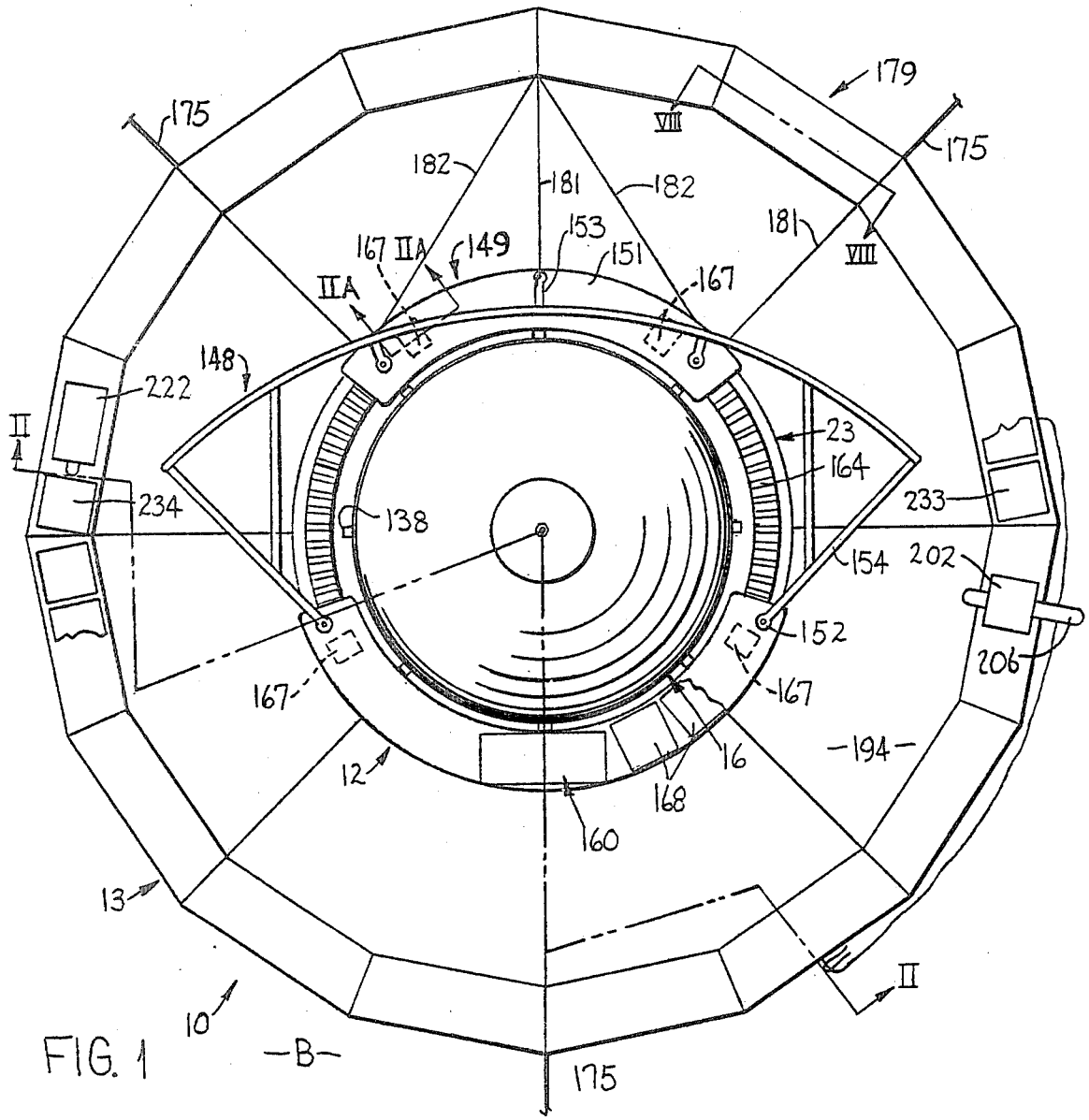
FIG. 1 is a top view of a floating solar still apparatus embodying the invention.
Figure 2A:
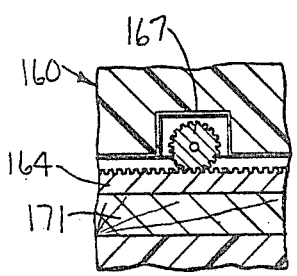
FIG. 2A is an enlarged sectional view substantially taken on line IIA—IIA of FIG. 1.
Figure 2:
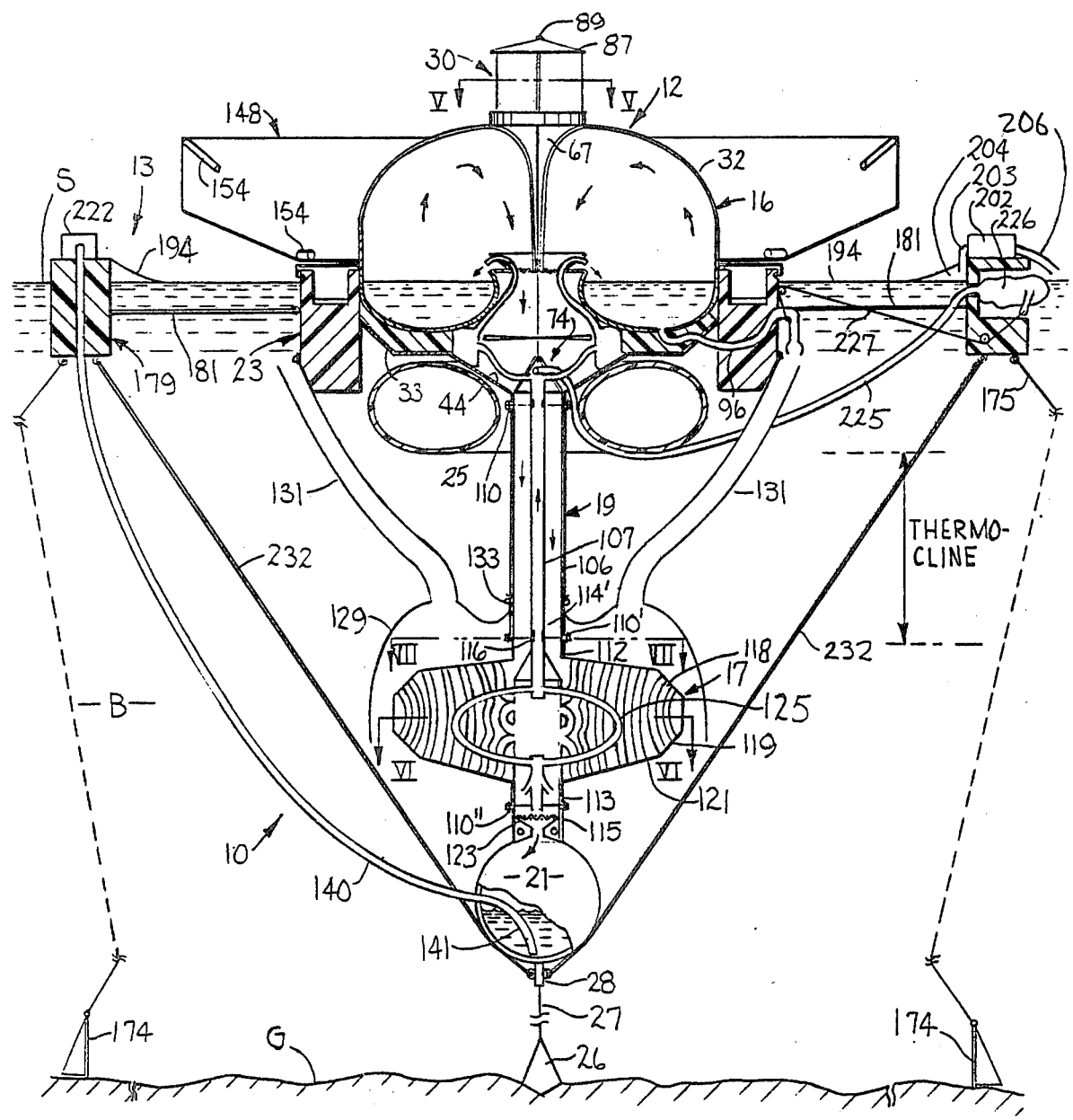
FIG. 2 is a side cross sectional view substantially taken on the line II—II of FIG. 1.

In the preferred embodiment of the invention shown in FIGS. 1-3, the floating solar still apparatus 10 comprises an axially elongate, upstanding, central distillation unit 12 coaxially surrounded by a stabilizing and accessory support unit 13.

Central distilling unit 12 comprises an evaporating chamber 16, a condenser 17 pendently coaxially spaced from and communicating with chamber 16 by a coaxial tube set 19, and a distillate holding tank 21 preferably coaxially pendently supported from and communicating with the outlet of condenser 17. An inner float ring 23 snugly coaxially surrounds the lower part of evaporating chamber 16 and supports same partially immersed in the body of water B. An inflatable, substantially toroidal bladder 25 of resilient material, e.g. like a common automotive inner tube, surrounds the upper portion of tube set 19 coaxially under chamber 16, and is inflatable and deflatable to finally adjust the buoyancy, and hence height in the water, of central distillation unit 12. Still apparatus 10 is preferably anchored to the ground G beneath body of water B, to control lateral location of still 10. Conveniently, a central anchor 26 (FIG. 2) connects by a line 27 to a ring 28 fixed to the bottom of tank 21. A fan unit 30, wind driven in the preferred embodiment shown, extends along the axis of evaporator chamber 12 for moving vapor from evaporating chamber 12 down into condenser 17 for liquifying such vapor and permitting same to drain, as distillage, into tank 21.

In more detail, the substantially toroidal evaporating chamber 16 comprises opposed, separable top and bottom portions 32 and 33 (FIGS. 2 and 3).

Bottom portion 33 (FIG. 3) comprises an upward opening base funnel 34 flanged at 35 for pendently supporting the coaxial tube set 19. An annular outer shell 37 generally of U-shape cross section opens upward and is fixed atop and extends generally radially outward from the upper end of funnel 34, the connection 38 therebetween being suitably sealed for watertightness and made rigid as by closely circumferentially spaced rivets. An annular inner shell 39 of modified U-shape cross section overlies and is fixed at 41 and 42 to the upper edges of outer shell 37. The connection at 41 may be as convenient, e.g. by welding or adhesive bonding or by a riveted and sealed flange connection (not shown) similar to that at 38. Inner shell 39 partly overlies funnel 34 and therewith forms a central, vertically open, substantially vase-shaped throat 44 connecting chamber 12 to tube set 19. A sunlight absorbing (hence preferably black) watertight liner 46 covers the upper surface of inner shell 39 to form an annular heating basin 47 for raw water, from the surrounding body of water B, to be distilled. If desired, liner 46 may be flexible and releasable from inner shell 39 for easier discarding or recovery of mineral or other residue left atop the liner due to continuing intake and distillation of water.

In general the water level in basin 47 is the same as that of the body of water B. To prevent raw water from basin 47 from sloshing into the throat 44 and thus contaminating distillate in the condenser, the inner upper edge of shell 39 is formed by a pair of upward and radially outward sloped water deflecting surfaces 49 and 50 extending above the basin water level and joined by a horizontal liner support step 51.

Insulation 53 filling the annular void between shells 37 and 39 limits heat loss from the heating basin 47 to the supporting body of water B to increase evaporator efficiency. Insulation 53 is preferably a conventional rigid foamed synthetic resin material, (e.g. urethane foam), which also tends to further rigidify the evaporating chamber.

Top portion 32 of chamber 32 comprises a substantially rigid domelike wall 56, e.g. molded of a substantially transparent synthetic resin material such as polyvinyl fluoride, fixed at its radially outer edge on the outer edge of bottom portion 33, in a releasable but water and vapor tight manner generally indicated at 42.

In a preferred form of the joinder structure 42 (FIG. 4), external edge flanges of shells 37 and 39 are fixed together, as by rivets 58 and surrounded by the reversed edge 59 of liner 46. An annular external flange 61 on dome 56 is surrounded by a U-section rubber seal 62. A further annular, U-section rubber seal 63 surrounds the resulting vertically stacked sandwich of flange, seal and liner surfaces of elements 37, 39, 46, 56 and 62 and when installed is elastically stretched to snugly grip same and hold same together in a secure yet releasable manner. Additional securement for the top and bottom portions of the evaporator 12 is provided by a plurality of circumferentially spaced spring clips 65 of conventional type biased to axially grip the aforementioned sandwich of flanges, liner and seal.

Evaporator top portion 32 includes a central, upwardly flared, trumpet-shaped vapor diverter 67, the upper end of which is fixed at 68 to the dome 56 as by rivets, preferably in sealed relation thereto, as by an intervening adhesive or sealing material not shown. The narrow lower end of deflector 67 is radially centered and secured in the central opening in an annular, horizontally disposed screen 69, whose perimeter extends to inner shell 39 adjacent the inner edge of step 51. The screen prevents the passage of particulate matter from basin 47 into throat 44, while permitting vapor formed under dome 56 to pass downward therethrough into throat 44. Funnel 34, shells 37 and 39, and diverter 67 may be, for example, of spun sheet aluminum.

Fan unit 30 (FIG. 3) includes a conventional propeller-type fan 74 having a circumferentially arranged plurality of radially extending blades carried by a center hub 75. Fan 74 has a vertical rotation axis coaxial with that of evaporating chamber 16 and the fan is disposed within the widest portion of throat 44. Fan hub 75 is fixed on and rotated by a shaft 77 radially confined by a bushing 78 fixed at the joinder of deflector 67 and screen 69, and a bushing fixed at the upper end of a hollow cone member 81 fixedly and coaxially supported within funnel 34 by circumferentially spaced, rigid struts 82. To permit vapor transfer from chamber 16 to condenser 17 without need for a fuel or electrical supply, and thus permit use of the basic distillation system without inconvenience in locations remote from civilization, the fan 74 is preferably wind driven. To this end, shaft 77 extends upward through deflector 67 and an opening 82 through the center of dome 56. The upper end of shaft 77 is fixed coaxially to a vertical axis wind-driven rotor 84 (FIGS. 3 and 5) of any convenient type. In the particular embodiment shown in FIG. 5, a modified, three-bladed, S-type rotor is used, its blades 86 being centrally fixed together and having shaft 77 led snugly upward therethrough. The blades 86 are fixed in a sandwich between upper and lower discs 87, the former if desired having a conical upper surface (FIG. 2) and the latter having a depending perimetral flange 88 (FIG. 3). To releasably secure rotor 84 to shaft 77, the latter has threaded thereon a stop nut 89 surmounting upper disc 87 (FIG. 2). A radial and axial thrust bearing 90, preferably of antifriction type, coaxially fixed atop the dome 56 bears on lower disc 87 and flange 88 of rotor 84 to radially locate the rotor and axially locate the rotor, shaft and fan. To block inadvertent upward motion of the shaft 77, the rotor flange 88 may be secured to the outer race of bearing 90 by a set screw 91. A suitable low friction seal may be provided at 91.

Dome 56 may be removed, as for inspection and cleaning of the interior of evaporating chamber 12, by removing the perimeter clips 65 and rubber seal band 63 (FIG. 4) and removing nut 89, leaving shaft 77 in place as dome 56, diverter 67, screen 69 and rotor 84 are lifted away.

A raw water inlet 93 for the basin 47 of any convenient type here includes a conventional tubular fitting, provided with seal washers 94, extending through and clamping therebetween the sandwich comprising liner 46, shell 39, insulation 53 and shell 37 and outwardly terminating in a hose 96 extending to a convenient nearby location in water body B.

In addition to providing a downward path for water vapor from evaporating chamber 16, throat 44 also houses the upper portion of the return channel by which air and any uncondensed vapor return from condenser 17 to evaporating chamber 16. Such return channel thus includes a central stub tube 98 (FIG. 3) extending up from tube set 19, closed at its upper end and emptying through several circumferentially spaced branch tubes 101 which extend upward along the walls of throat 44, beyond the reach of fan 74, and thence up past the edge of screen 69. The upper ends of branch tubes 101 extend through openings near the upper edge of deflector surface 50 where they are snugly held as seen at 102, to open toward annular basin 47. Interposed in each branch tube 101 is a boxlike water trap 104 (FIG. 3) such that any raw water from basin 47 as may splash into the upper end of branch tube 101 is entrapped in box 104 before it can proceed through the lower portion of tube 101 and back down to the condenser to contaminate distilled water produce thereby. Each trap 104 is fixed, as by adhesive bonding or the like, to the peripheral wall of throat 44. Stub tube 98 is fixed coaxially of the funnel 34 by any convenient means, as by making at least the lower portions of branch tubes 101 of a suitable rigid material.

Tube set 19 is preferably of sufficient length to locate the condenser 17 below the thermocline in the body of water B, as well as maintaining it well separated from the solar heated evaporating chamber 16 and any heat losses therefrom to adjacent water of the body B. Tube set 19 comprises normally coaxial outer and inner tubes 106 and 107, which may be rigidly fixed with respect to each other as by direct connection through radial struts (not shown), or more simply, merely by attachment to relatively fixed parts of evaporating unit 16, on the one hand, and condenser 17, on the other hand.

Outer tube 106 connects in a rigid watertight manner to the lower end 35 of funnel 34 by a conventional flanged connection 110 secured by circumferentially spaced bolts 108 and incorporating a seal ring 109, as seen in FIG. 3. Condenser vapor inlet tube 112 and distillate outlet tube 113 (FIG. 2) are coupled to outer tube 106 and tank inlet tube 115 by preferably similar releasable, sealed connections 110' and 110''. Conveniently, inner tube 107 connects snugly, though not necessarily with a watertight seal, to stub tube 98 through a telescoped connection 114 (FIG. 3) and a preferably similar separable connection is made at 114' (FIG. 2) between the lower end of inner tube 107 and the upper end of the inner, vapor and air return tube 116.

Condenser 17 may be of any convenient form capable of receiving downwardly directed vapor from outer tube 106, condensing same, directing the resulting distillate to inlet 115 of holding tank 21, and returning air and any uncondensed vapor upwardly through return tube 116 and inner tube 107 to the evaporating chamber to complete the loop through which air and vapor is moved by fan 74. The particular condenser 17 here shown (FIGS. 2, 6 and 7) is a generally elliptical cross section (as seen in FIG. 2), closed container having perimetrally joined top and bottom walls 118 and 119 through which respectively communicate vapor inlet tube 112 and distillate outlet tube 113. A plurality of substantially vertical raw water tubes 121 extend entirely through top wall 118, the general ellipsoidal interior space, and bottom wall 119 of the condenser 17, such that raw water from the body B enters tubes 121, extracts heat from the tubes, is thereby heated, and in consequence is thermosiphoned upward through such tubes 121. At the same time, water vapor from evaporator 16 occupies the space between top and bottom walls 118 and 119 among the raw water tubes 121, all of which surfaces are cooled by raw water in contact therewith, causing such water vapor to condense on these surfaces and eventually run downward onto and along bottom wall 119 into tank 21. It will be noted that the generally ellipsoidal interior of the condenser 17 is thus sealed against entry of contamination by raw water. The aforementioned surfaces of condenser 17 preferably are of good heat conducting material, typically a metal such as aluminum. If desired, a screen 123 (FIG. 2) may be interposed in distillate inlet tube 115 of tank 21 to block any possible particulate intake.

The vapor and air return tube 116 may be supported by any convenient means within the generally ellipsoidal interior of condenser 17, for example by suitable struts, as at 124 in FIG. 6. Return tube 116 preferably starts near the bottom of the central portion of the condenser, splits into plural generally U-shaped branches 125 which rejoin near the upper portion of the condenser in a single central return tube, the branches providing extra surface area for extracting heat from fresh incoming vapor entering the condenser and thereby serving to in part preheat returning air and vapor prior to its movement upward through inner tube 107 and back into evaporating chamber 16.

A heat skirt 129 of inverted cup-shape, of rubber or the like, loosely overlies and circumferentially surrounds condenser 17 to direct raw water from body B, heated and thus urged upward by condenser 17, up through at least one extension tube 131. Extension tube or tubes 131 may be fixed to inner float ring 23 to support heat skirt 129. Tube set 119 extends upward through a central opening in the heat skirt 129 which is snugly clamped thereto at 133 by any convenient means. At least one tube 131 preferably has its upper end directed at the inlet of raw water inlet tube 96 to partly preheat raw water entering evaporation chamber 16.

The inner float ring 23 (FIG. 3) contributes buoyancy to the central distillation unit 12, above described, and in the preferred embodiment shown is a molded synthetic resin foam unit (e.g. of urethane foam) here reinforced by a wood core 135. Ring 23 closely surrounds the bottom portion 33 of evaporating chamber 16 and has a circumferentially continuous relief 137 in its upper, inner edge for snugly receiving the joined edge flange structure, shown in FIG. 4, of the top and bottom evaporator chamber portions 32 and 33, to vertically support the evaporating chamber and the remaining dependent portions of the central distilling unit 12 above described. Circumferentially periodic notches 138 deepen the relief 137 to receive the spring clips 65.

A basic solar still embodying the invention has been described above. While its operation will be apparent from the above description, same is briefly summarized below for convenience.

The central distillation unit 12, anchored at 26 (FIG. 2), floats vertically by reason of support of evaporation chamber 16 on inner float ring 23 and bladder 25. The bladder is adjusted so the raw water level in body B lies above inlet 93 and such that the water level in basin 47 will not rise above an intermediate point on deflecting surface 49 (e.g. level L) and particularly not to level of step 51, during ongoing operation of the apparatus. Sunlight entering transparent dome 56 is absorbed by dark liner 46 which transfers the absorbed energy to the water in basin 47 to heat and gradually vaporize same. The water vapor thus collecting beneath dome 56 is impelled by fan 74 downward through throat 44, outer tube 106 and thence into the ellipsoidal interior chamber of condenser 17. The vapor is cooled by contact with, and transfer of its heat to, the raw water cooled top and bottom surfaces and tubes of condenser 17, which in turn transfer heat to the adjacent raw water within the confines of heat skirt 129. Raw water thus heated by condenser 17 rises through tubes 131 and may be used, for example, as partly preheated raw water input for evaporating chamber 16. Cooled vapor condensing on interior surfaces of condenser 17 flows by gravity along the condenser bottom down into holding tank 21. Air and the uncondensed vapor, displaced from the condenser by fresh vapor inputs by fan 74, returns up through pipe 107 and branch tubes 101 and from outlets 102 thereof returns to the evaporating zone beneath dome 56. Operation of the apparatus as above disclosed is necessarily periodic since it depends on the presence of sunshine and wind to produce and circulate vapor; on the other hand, the described apparatus operates independent of manmade energy inputs (electricity, fossil fuels, etc.).

As tank 21 fills, its own buoyancy is somewhat reduced. However, the resulting tendency of the distillation unit 12 to set lower in the water is relatively slight in view of the substantially large cross sectional area of flotation adjacent the surface of the body B in ring 23, chamber 16, etc. A hose 140, suitably extended at 141 into the bottom portion of tank 21 is provided for periodically recovering distilled water from the tank 21.

MODIFICATION

While operable as above described to produce distilled water, apparatus 10 preferably incorporates additional structure to increase production of distilled water and enhance local marine growth, as hereafter discussed.

To increase the solar energy input through transparent dome 56 into evaporating chamber 16, the curved, preferably parabolic, reflector 148 (FIGS. 1 and 2) is arranged to reflect sunlight onto absorbing liner 46 through a wide range of solar elevation angles, either directly or indirectly by focusing on and resulting reflection from deflector 67. To permit reflector 148 to at least approximately track the sun in its daily east-west passage across the sky, a substantially circular carriage 149 is supported for coaxial rotation on inner float ring 23. Carriage 149 (FIGS. 1 and 3) includes semicircular, circumferentially spaced carriage segments 151 and 152 rigidly connected by struts 153 and 154 in turn fixedly supporting reflector 148. Carriage segments 151 and 152 here are of substantially T-shaped cross section (FIG. 3), with a lower portion riding in an upward opening circumferential groove 156 disposed coaxially in inner float ring 23. Unintended lifting of reflector 158 and carriage 149 off float 23 is prevented by a circumferential lip 157 on float 23 which loosely overhangs outwardly releasable pins or screws 158 distributed circumferentially along the outer edge flange portion of carriage segments 151 and 152.

Various devices are known for moving a reflector to track the sun. At least approximate tracking is here simply accomplished by including in carriage segment 152 a drive unit 160 (FIGS. 1 and 3) having a conventional DC electric gear motor 161 rotatably driving a toothed drive roller 162 (FIG. 3) and powered by a battery pack 163. Drive roller 162 engages a toothed track 164 coaxially fixed to float ring 23. Additional, circumferentially spaced rollers rotatably carried on the underside of carriage segments 151 and 152 roll in float groove 156, as on track 164, to rotatably support the carriage thereon. Gear motor 161 is a constant speed unit of modest power requirement geared to rotate the reflector at a one-revolution-per-day rate. If desired, drive unit 160 may use a manually wound spring motor, capable of running a preselected number of days before rewinding, instead of the electric motor 161 and battery pack 163. On the other hand, in view of the low energy requirement for the daily reflector rotation, the top surfaces of carriage segments 151 and 152 may be covered with electricity generating solar cells (e.g. silicon cells), in part shown at 168, to replenish batteries 163.

Carriage segments 151 and 152 may be of any desired construction (e.g. hollow sheet metal box structures). The reinforcing wood core 135 in float 23 preferably comprises a horizontal, circumferential extended wood member 171 carrying upstanding circumferentially spaced dowels 172 encapsulated in the plastic foam comprising block 23, with track 164 conveniently secured to wood member 171.

To maintain the float 23 circumferentially fixed and thus avoid circumferential mispositioning of the reflector 148 by wind, suitable means such as additional ground engaging anchors 174 (FIG. 10) are spaced radially outward from the apparatus 10 with elongate, tensioned, gradually sloped lines 175 connected directly, or in the present embodiment indirectly, to float ring 23 in a rotation preventing manner.

In the embodiment shown, an outer float ring 179 (FIGS. 1 and 2) is held in radially spaced and coaxial and circumferentially fixed securement to inner float ring 23, here by circumferentially spaced ties 181. The ties 181 may be radially and circumferentially rigid, but here are tensioned rope or wire lengths tied to eyes 183 (FIG. 3) fixed to ring 23 and to upstanding pins 184 (FIG. 8) fixed on ring 179. Ties 181 are taut and extend radially, preferably with additional ties 182 extending chordally for sure circumferentially locking of rings 23 and 179.

Ring 179 conveniently comprises plural circumferentially arranged segments 186 constructed as shown in FIGS. 8-10 of buoyant materials, here a synthetic resin foam (e.g. urethane foam) core block 188 sandwiched horizontally between upstanding wood end plates 189, the whole being sandwiched between overlying and underlying stacked pairs of top and bottom wood plates 190 and 191. Within the pairs 190 and 191, the plates are horizontally offset from each other to permit the overlapped, interfingered joinder of segments 186 shown in FIG. 8, to form the annular outer float ring 179. Segments 186 are conveniently fixed one to the next by aforementioned pins 184 extending through holes 192 in the overlapped ends of horizontal plates 190 and 191.

An annular transparent sheet 194, e.g. of synthetic resin material such as polyethylene, spans the space between float rings 23 and 179. Sheet 194 is here secured at its inner periphery to float 123 by an elastic ring 196 (FIG. 3) located in an annular groove 197 in the outer wall of float 23. The outer portion of sheet 194 may be secured to outer float 179 in any desired manner. FIG. 9, for example, illustrates a fragment of sheet 194 being secured to the top of a float segment 186 and overlying, inverted U-shape metal clip 198. A snap fit and/or screws 199 secure clip 198 and sheet 194 atop segment 186. While a tight air seal is not normally required between annular sheet 194 and ring 179, tighter sealing can be obtained variously, e.g. by doubling back under an edge portion 200 of annular sheet 194, and extending same in downward direction along the radially inward face of the ring segments 186.

Figure 11:
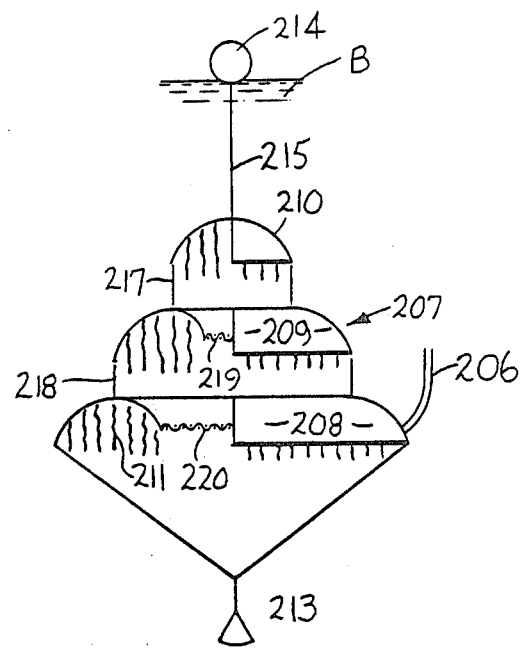
FIG. 11 is a partially broken side view of an oxygen trap connected to the apparatus of FIGS. 1 and 2.
Figure 12:
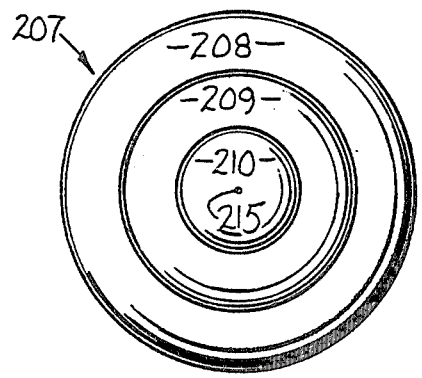
FIG. 12 is a top view of the trap of FIG. 11.

An air pump 202, here conveniently mounted on outer float ring 179, has an inlet 203 in communication with the annular air space 204 where transparent sheet 194 is secured to outer float ring 179. An outlet hose 206 extends from pump 202 down to an oxygen-to-water diffusion device, or oxygen trap, 207 (FIGS. 11 and 12). Trap 207 here comprises domed cross section, diminishing diameter air entrapment rings 208 and 209 coaxially vertically stacked and surmounted by a coaxial gas entrapment dome 210. Cotton wicks 211 depend from the domed members 208-210 and at their lower ends engage water of the body B. This wets the wicks throughout their lengths for diffusion of oxygen-rich air trapped beneath domes 208-210 into the water of the body B. The oxygen trap 207 is preferably located beneath the thermocline in body of water B near but not necessarily directly below outer ring 279, as by an anchor 213. Conveniently, a buoy 214, secured by a line 215 to dome 210, floats atop the body B of water to dependently support the oxygen trap 207 and permit easy visual location thereof. Trap 207 is completed by skirts 217 and 218 which interconnect the domed members 210, 209 and 208 in progressive depending relation, and screens 219 and 220 which span the open central portions of ring members 208 and 209, e.g. to reduce to small bubble size gases transferred upward from one dome member to the next.

To briefly review the marine growth enhancement aspects of the present invention, heat released by condenser 17 to the raw water of body B within heat shield 129, particularly when below the thermocline, promotes upward flow of warmed, nutrient-laden raw water through tubes 131 to beneath transparent annular sheet 194. Resultant entrapment of nutrients between floats 23 and 179 and sunlight entering through transparent sheet 194 combine to enhance the growth and productivity of phytoplankton beneath sheet 194. This has a two-pronged effect. First, oxygen produced by the phytoplankton accumulates beneath sheet 194 and is removable by pump 202, to oxygen trap 207. Trap 207 introduces oxygen to water of the body B, preferably below the thermocline, to promote animal (fish) growth. Second, the phytoplankton provide food for fish, either directly or through a food chain including, for example, zooplankton.

Outer float ring 179 also conveniently provides a support for a liquid pump 222 (FIG. 2), connected by hose 140 to the outlet of distillate holding tank 21 and periodically actuable for recovering distilled water therefrom.

If desired, means may be provided to block entry of further raw water through inlet hose 96, into evaporating chamber 16, when tank 21 has substantially filled.

For example, where chamber 16, tube set 19, condenser 17 and tank 21 form a substantially airtight system, filling of tank 21 with distillate displaces air therein and tends to lightly pressurize the air beneath dome 56 and in throat 44. In FIG. 2, an air hose 225 communicates between throat 44 and an inflatable lift bladder 226 which may be conveniently fixed to the inlet end of raw water inlet tube 96 either to lift same above the surface of water body B beneath film 194 or to block same. Alternately, the lift bladder 226 may be supported as here shown on a hollow-out one or several of the segments of outer float ring 179 to lift or stopper tube 96, through any convenient mechanical coupling here schematically indicated by pulley supported line 227.

Alternately, and particularly where chamber 16, etc., is not airtight, central distilling unit 12 may be permitted to sink slightly as tank 21 fills, in which case a conventional float valve may be used to shut off inlet tube 96. Such float valve may be responsive either to a rise in exterior water level with respect to the inlet of tube 96 or to a rise in water level within the basin 47 (e.g. toward level L in FIG. 3). A suitable in-basin float valve is shown at 230 in solid lines in an open condition, and in dotted lines at 230' in its closed position due to a rise in basin water to a desired maximum, e.g. approximately at level L.

For stabilizing the distilling unit against pendulum-like movement, at least three evenly circumferentially distributed stabilizing lines 232 (FIG. 2) here extend tautly between the lower end of tank 21 (at 128) up to fixed securement to outer float ring 179.

If desired, pumps 202 and 222 may be electrically operated motor driven pumps and to this end electric battery packs may be incorporated into a common housing with each motor pump. Also, further electricity generating solar cells (e.g. silicon cells) 233 and 234, like aforementioned cells 168, may be fixed atop a float ring 179 and electrically connected with the battery packs of motor pumps 202 and 222 to permit pumping by the latter when desired.

The apparatus 10 may be constructed in a wide range of sizes, a float ring 23 diameter of about six feet being well within such range. Condenser 17 preferably lies below the thermocline in water body B, the depth of which will vary from body to body. Different length tube sets 19 may be used to provide different condenser depths. Condenser depths may vary in, or indeed beyond, the range of three to eight feet.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A floating solar still apparatus, comprising:
  a solar energized evaporating chamber including an annular sunlight absorbing basin for water to be distilled covered by a sunlight admitting top wall, and adapted to float on a body of water to be distilled;
  a condenser and tube means pendently supporting said condenser from said evaporating chamber and defining a gas transfer loop therebetween, said loop having an output leg for supplying vapor from said evaporating chamber to said condenser and a return leg for returning air from said condenser to said evaporating chamber,
  a hollow, upwardly flared, generally trumpet shaped diverter extending coaxially downward from the top of said evaporating chamber for smoothly diverting vapor downward from said chamber through the central opening of said annular basin to said tube means;
  a fan member located in said loop between said evaporating chamber and tube means and actuable for circulating air through said loop between said evaporating chamber and condenser to carry vapor from said chamber to said condenser;
  a wind-driven rotor rotatably supported atop said diverter and rotatably driving a shaft extending down through said diverter, said fan member being fixed to said shaft below said diverter.

2. The apparatus of claim 1 including a reflector and means supporting same outside and opposite said evaporating chamber for reflecting sunlight thereinto, said reflector being curved around said evaporating chamber for reflecting sunlight thereinto, said upwardly flared, substantially trumpet shaped diverter having a reflecting outer surface for reflecting a portion of the sunlight from said reflector toward said light absorbing basin.

3. The apparatus of claim 2 including an inner float ring fixed around said evaporating chamber and circular track means supported on said inner float ring, a carriage supporting said reflector for rotation along said track means, to position said reflector to reflect sunlight into said evaporating chamber.

4. The apparatus of claim 3 including motor means operatively connected between said carriage and track means for rotating said reflector around said evaporating chamber at a preselected rate to at least approximately track the sun, and including means for preventing unwanted rotation of said inner float ring as by wind so as to avoid gross tracking errors by said reflector.

5. A floating solar still apparatus, comprising:
  a solar energized evaporating chamber including an annular sunlight absorbing basin for water to be distilled covered by a sunlight admitting top wall, and adapted to float on a body of water to be distilled;
  a condenser and coaxial output and return tubes pendently supporting said condenser centrally from said floating evaporating chamber and defining a gas transfer loop therebetween, in which said output tube supplied vapor from said evaporating chamber to said condenser and said return tube returns air from said condenser to said evaporating chamber, said loop further including a central throat surrounded by said annular basin and extending down from said evaporating chamber to said output tube, said central throat being open at its upper end through the center of said annular basin to said evaporating chamber above the normal water level in said basin;
  a driven fan member rotatable centrally within said throat for circulating air through said loop between said evaporating chamber and condenser to carry vapor from said chamber to said condenser.

6. The apparatus of claim 5, including upward and radially outward sloped water deflecting surfaces interposed horizontally between said throat and basin to block sloshing of raw water from said basin into said throat, said return tube including branch tubes routed up through said throat and opening to said basin at said deflecting surfaces.

7. The apparatus of claim 5 in which said evaporating chamber is substantially of toroidal shape, said top wall being domelike, said basin and top wall having perimeter flanges axially opposed to each other and releasably secured to each other, and including a float ring snugly surrounding said basin, said basin and top wall being supported on said float ring by said flanges thereof.

8. The apparatus of claim 5 in which said condenser comprises a hollow, horizontally widened end closure having a plurality of coolant tubes extending substantially vertically therethrough, the interior of said enclosure communicating through said outlet and return tubes with said evaporating chamber to place vapor therefrom in condensing contact with the outsides of said tubes to transfer heat therefrom to water of said body within said tubes.

9. The apparatus of claim 5 including a distillate holding tank connected to the outlet of said condenser for receiving distilled water therefrom, and inlet means for supplying raw water from said body of water into said basin and means actuable for closing said inlet means in response to sufficient filling of said tank.

10. A floating solar still apparatus, comprising:
- a solar energized evaporating chamber including a sunlight absorbing basin for water to be distilled covered by a sunlight admitting top wall, and adapted to float on a body of water to be distilled;
- a condenser and tube means pendently supporting said condenser from said evaporating chamber and defining a gas transfer loop therebetween, said loop having an output leg for supplying vapor from said evaporating chamber to said condenser and a return leg for returning air from said condenser to said evaporating chamber;
  - means located in said loop between said evaporating chamber and condenser and actuable for circulating air through said loop between said evaporating chamber and condenser for carrying vapor from said chamber to said condenser;
  - an inner float ring surrounding and supporting said evaporating chamber and adapted to support said evaporating chamber on said body of water, a heat skirt loosely arranged around the top and sides of said condenser and including tubular means for routing raw water of said body warmed by said condenser within said heat skirt, up toward said inner float ring.

11. The apparatus of claim 10 including an outer float ring loosely surrounding said inner float ring and connected thereto by an annular transparent film at a height substantially corresponding to the surface of the body of water, and means directing the warmed rising water from said tubular means extending from said heat skirt into the area between said float rings and below said annular transparent film for encouraging growth and oxygen production by phytoplankton.

12. The apparatus of claim 11 including an air pump supported on said outer float ring having an inlet communicating with a space below said annular film and actuable for removing oxygen-rich air therefrom.

13. The apparatus of claim 12 including an oxygen trap comprising domelike means disposable in said body of water near said outer float ring and including an air outlet tube extending from said pump to said domelike means for supplying oxygen-rich air for entrapment beneath said domelike means, and oxygen-to-water diffusing means in said domelike means.

14. A floating solar still apparatus, comprising:
- a solar energized evaporating chamber including a sunlight absorbing basin for water to be distilled covered by a sunlight admitting top wall, and adapted to float on a body of water to be distilled;
- a condenser and tube means pendently supporting said condenser from said evaporating chamber and defining a gas transfer loop therebetween, said loop having an output leg for supplying vapor from said evaporating chamber to said condenser and a return leg for returning air from said condenser to said evaporating chamber;
- means located in said loop between said evaporating chamber and condenser and actuable for circulating air through said loop between said evaporating chamber and condenser for carrying vapor from said chamber to said condenser;
- inlet means for supplying raw water from said body of water into said basin, a heat skirt around said condenser and means directing raw water heated by said condenser toward said raw water inlet means for partial preheating of raw water admitted to said basin.

* * * * *